(12) United States Patent
Alsina et al.

(10) Patent No.: US 9,826,354 B2
(45) Date of Patent: Nov. 21, 2017

(54) CONTENT GEOFENCING

(71) Applicant: Apple Inc., Cupertino, CA (US)

(72) Inventors: Thomas Alsina, Mountain View, CA (US); David T. Wilson, Campbell, CA (US); Kenley Sun, Cupertino, CA (US); Sagar Joshi, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/152,241

(22) Filed: May 11, 2016

(65) Prior Publication Data

US 2016/0366551 A1 Dec. 15, 2016

Related U.S. Application Data

(63) Continuation of application No. 14/185,797, filed on Feb. 20, 2014, now Pat. No. 9,369,840.

(51) Int. Cl.
*H04W 4/02* (2009.01)
*H04L 29/08* (2006.01)

(52) U.S. Cl.
CPC .......... *H04W 4/021* (2013.01); *H04L 67/306* (2013.01); *H04W 4/025* (2013.01)

(58) Field of Classification Search
CPC ......... G06F 17/30867; G06F 17/30035; G06F 17/30905; H04W 4/021; H04W 4/025; G06C 30/02; G06C 30/0269; G06C 30/0273
See application file for complete search history.

(56) References Cited

U.S. PATENT DOCUMENTS

| | | | |
|---|---|---|---|
| 8,396,485 B2 | 3/2013 | Grainger et al. | |
| 8,422,994 B2 | 4/2013 | Rhoads | |
| 8,751,513 B2 * | 6/2014 | Priyadarshan | .... G06F 17/30221 705/14.4 |
| 8,971,930 B2 | 3/2015 | Li et al. | |
| 8,977,293 B2 | 3/2015 | Rodriguez et al. | |
| 8,996,402 B2 * | 3/2015 | Priyadarshan | ..... G06Q 30/0241 705/14.42 |
| 2012/0208592 A1 | 8/2012 | Davis et al. | |
| 2013/0090965 A1 | 4/2013 | Rivere | |
| 2013/0178233 A1 | 7/2013 | McCoy et al. | |
| 2013/0262479 A1 | 10/2013 | Liang et al. | |
| 2013/0273968 A1 | 10/2013 | Rhoads et al. | |
| 2013/0304581 A1 * | 11/2013 | Soroca | .............. G06F 17/30035 705/14.64 |
| 2013/0311871 A1 * | 11/2013 | Turner | ................... G06Q 10/00 715/234 |

(Continued)

FOREIGN PATENT DOCUMENTS

WO 2013/093184 6/2013

*Primary Examiner* — Diane Mizrahi
(74) *Attorney, Agent, or Firm* — Polsinelli LLP

(57) ABSTRACT

Systems, methods, and computer-readable storage media for invitational content geofencing. A system first sends, to a server location data associated with the system, the location data being calculated at the system. The system then receives a listing of places of interest within a geofence including a geographical perimeter for identifying places of interest in the listing, the geofence being based on the location data associated with the system. Next, the system selects a place of interest from the listing based on a location of the system. The system then presents a content item associated with the place of interest.

20 Claims, 6 Drawing Sheets

| | Values | Predicted Location (at Time X) | Predicted Location (at Time Y) |
|---|---|---|---|
| Current Location | (X, Y) | | |
| Velocity | 8mph | | |
| Direction | 90° | (A, B) | (C, D) |
| Acceleration | 2 m/s² | | |
| Context | Car Highway Active Headphones Time App Usage | | |

(56) References Cited

U.S. PATENT DOCUMENTS

| | | |
|---|---|---|
| 2015/0141037 A1 | 5/2015 | Saha et al. |
| 2015/0281889 A1 | 10/2015 | Menendez |
| 2016/0007209 A1 | 1/2016 | Hohs et al. |
| 2016/0110764 A1* | 4/2016 | Priyadarshan ......... G06Q 10/10 705/14.53 |

* cited by examiner

| | Values | Predicted Location (at Time X) | Predicted Location (at Time Y) |
|---|---|---|---|
| Current Location | (X, Y) | (A, B) | (C, D) |
| Velocity | 8mph | | |
| Direction | 90° | | |
| Acceleration | 2 m/s² | | |
| Context | Car   Highway<br>Active   Headphones<br>Time   App Usage | | |

FIG. 4

CONTENT GEOFENCING

CROSS REFERENCE TO RELATED APPLICATIONS

This application is a continuation of, and claims the benefit of priority to, U.S. application Ser. No. 14/185,797, filed on Feb. 20, 2014, which is expressly incorporated by reference herein in its entirety.

TECHNICAL FIELD

The present technology pertains to invitational content, and more specifically pertains to client-side, invitational content geofencing.

BACKGROUND

Mobile advertising is widely used by advertisers to market their products via mobile devices. Given the widespread availability of mobile devices, mobile advertising can be an extremely effective way for advertisers to reach a wide mass of potential customers and induce numerous users to purchase their products. By targeting mobile users with effective mobile advertisements, advertisers can yield large financial returns from their mobile advertisements. Not surprisingly, many advertisers continuously measure the performance of their advertisements to understand how, if necessary, they can optimize their advertisements for a better performance.

Current solutions often attempt to obtain information about a user or segment to modify an advertisement campaign based on such information about the user or segment. This allows the advertisers to better target their advertisements and modify the presentation parameters for better performance. Disadvantageously, the current solutions typically preselect the advertisements for presentation to a user without regard to a user's current context or location. Yet the potential interest of a user in an advertisement can be greatly influenced by the user's current context or location. However, in selecting an advertisement for a user, advertisers must take great care to protect the privacy of the user's information. As a result, it is very difficult for advertisers to collect private user information to aid in the selection of advertisements targeted for that user. In fact, users are generally unwilling to allow advertisers to collect their private information or transmit their private information to a content server, for use in targeting content to the user or any other purpose.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to target content to a user from a client device based on the user's current or predicted location. This way, the client device can present, to the user, items of content that are relevant to the user based on the user's current or future context and location. Here, the client device can select specific items of content that are relevant to the user for presentation to the user based on the user's location, without transmitting private and exact location information of the user to a server device or any other third party. Thus, the collection and use of a user's exact location can be performed at the client side without having to unnecessarily share exact location information with a server, to protect the privacy of such information. Accordingly, the client device can use private location information to better target content to a user, while at the same time protecting the privacy of such information.

Disclosed are systems, methods, and non-transitory computer-readable storage media for content geofencing. A system, such as a client device associated with a user, first sends, to a server, location data associated with the system, the location data being calculated at the system. The location data can include a degraded location. The degraded location can include one or more coordinates or an address, for example. Moreover, the location data can be determined by the system using a GPS or cellular technologies, such as triangulation and cell identification.

The location data can be calculated at the system using sensors, user inputs, stored data, and/or external data. For example, the location data can include sensor data collected by system. The sensor data can refer to any data collected, measured, captured, or detected by a sensor associated with the system. For example, the sensor data can include data obtained from an accelerometer, a gyroscope, a global positioning system (GPS), a camera, a microphone, a touch screen, a light sensor, a scanner, a magnetometer, a pedometer, a timer, etc. In some embodiments, the sensor data can include information regarding the motion or movement of the system, the motion or movement of surrounding objects, the position or location of the system, one or more coordinates associated with the system, a velocity of the system, an acceleration of the system, a direction of the system, etc.

Moreover, the system can also send, to the server, a request for a listing of places of interest based on the location data, or a perimeter identified based on the location data and/or a place of interest for example. The request can be triggered by a user action, such as a user input, a user activity, a user status, an application usage, a device usage, and so forth. The request can also be triggered based on additional status information, such as system status, for example.

Next, the system receives a listing of places of interest within a geofence including a geographical perimeter for identifying places of interest in the listing, the geofence being based on the location data associated with the system. In some cases, the geofence can be an area surrounding one or more places of interest associated with items of invitational content. For example, the geofence can be the area surrounding every place of interest having associated advertisements to be served by the system. The listing of places can be received from a server that maintains a database or master list of places. However, in some cases, the system can also maintain the list of places and may not need to receive the list from a server or a separate device. Moreover, the listing of places of interest can be a list of places filtered from the database or master list of places at the server. The places can be filtered to create the listing of places of interest based on the geofence information and location data associated with each of the places in the database or master list. Further, the listing of places of interest can be ordered or ranked based on one or more factors, such as a category, a rating, a cost, a preference, and so forth.

In some cases, the listing of places of interest can include a respective content item associated with each place in the listing of places of interest. For example, the listing of places of interest can include one or more media items for each place of interest in the list. The content items can include invitational content associated with a campaign of invitational content, for example.

The system then selects a place of interest from the listing based on a location of the system, and presents a content item associated with the place of interest selected. Here, the system can calculate its current or predicted location and select a specific place of interest from the listing based on the calculated values. The system can use the location data to calculate its current or predicted location. A predicted location of the system can also be determined based on a user input, such as a gesture; a velocity; an acceleration; a direction; a movement; etc.

When selecting a place of interest, in some cases, the system can weigh a proximity of each of the places in the listing relative to the system and generate respective rankings of each of the places to select the place of interest. The system can also filter the listing based on one or more ranking levels of the places in the listing, and further filter the listing based on a proximity to identify or select the specific place of interest best matching the applied criteria. The system can also filter the listing to select the place of interest based on one or more additional factors, such as an age or date of associated content; a proximity relative to a second place, such as a bank; a category of content or items; a preference; a keyword; etc.

After selecting the specific place of interest, the system can present an item of invitational content corresponding to the place of interest selected. This way, the system can target content to the user based on the user's location, and any other additional criteria. The targeting of such content can be provided at the client-side, as opposed to server-side, to limit or minimize the amount of private information transmitted to the server for targeting content. For example, the system can be a client device configured to present media items to a user based on a user's location as determined by the client device, without having to transmit specific details regarding the user's location to a server, or otherwise share the user's private information. Moreover, unlike traditional geofence-based advertising technologies which generally trigger an advertisement or alert based on a detection of a user being located within the geofence, the content items or advertisements presented by the user based on geofence information here can be triggered by a user action, such as a user input, a user activity, an application usage, etc. For example, the user's request to launch an application on the mobile device can trigger a geofence-based presentation of content as previously described.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4 illustrates an exemplary location prediction table;

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for accurate and efficient targeting of content to users using location information. Disclosed are systems, methods, and non-transitory computer-readable storage media for content geofencing. A brief introductory description of an exemplary configuration of devices and a network is disclosed herein. A detailed description of content geofencing, and exemplary variations will then follow. These variations shall be described herein as the various embodiments are set forth. The disclosure now turns to FIG. 1.

Figure 1:
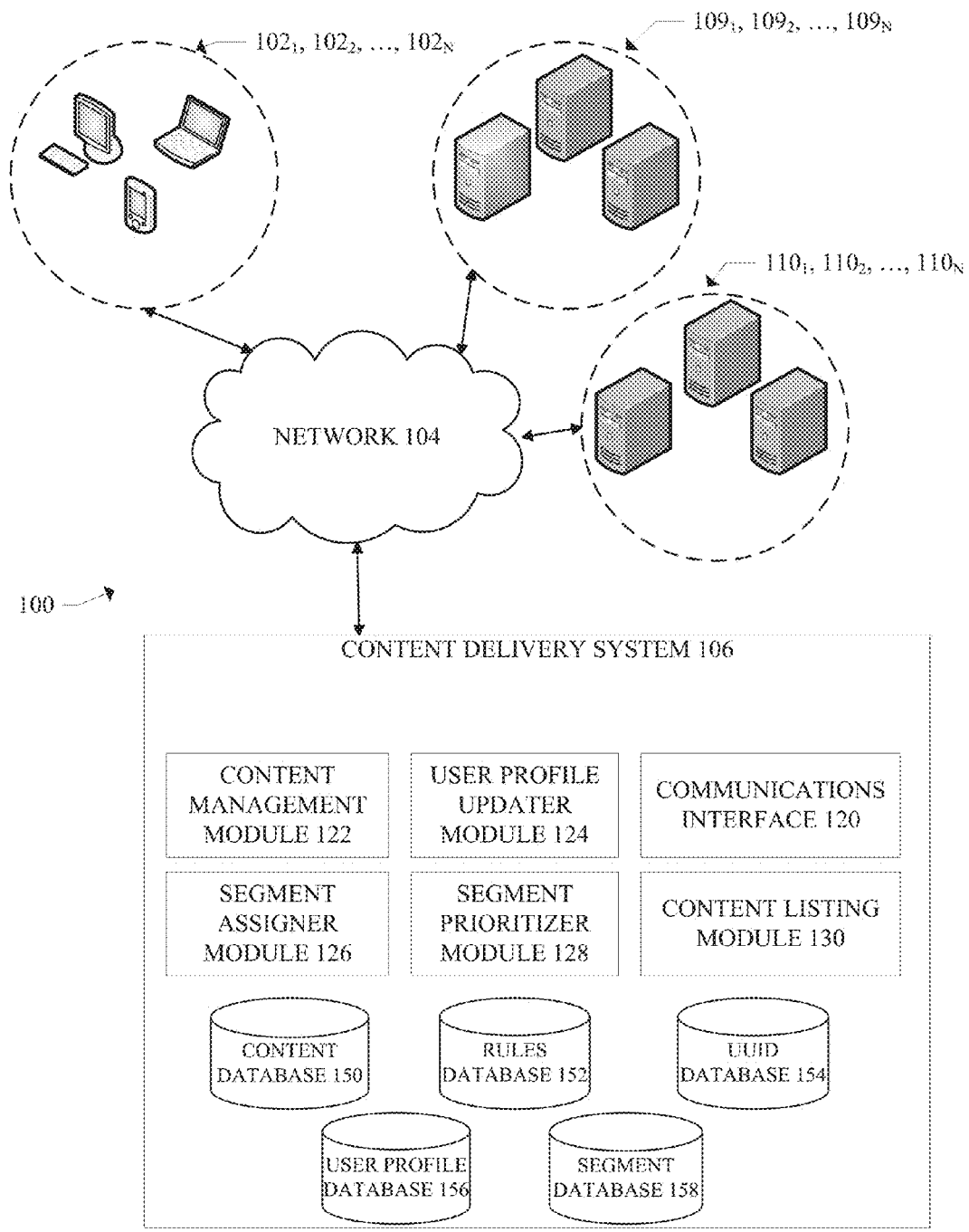
FIG. 1 illustrates an exemplary configuration of devices and a network.

An exemplary system configuration 100 is illustrated in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, invitational content can be delivered to user terminals $102_1$, $102_2$, . . . , $102_n$ (collectively "102") connected to a network 104 by direct and/or indirect communications with a content delivery system 106. User terminals 102 can be any network enabled client devices, such as desktop computers; mobile computers; handheld communications devices, e.g. mobile phones, smart phones, tablets; smart televisions; set-top boxes; and/or any other network enabled computing devices. Furthermore, content delivery system 106 can concurrently accept connections from and interact with multiple user terminals 102.

The content delivery system 106 can receive a request for electronic content, such as a web page, an application, a media item, etc., from one of user terminals 102. Thereafter, the content delivery system 106 can assemble a content package and transmit the assembled content page to the requesting one of user terminals 102. To facilitate communications with the user terminals 102 and/or any other device or component, the content delivery system 106 can include a communications interface 120.

The content delivery system 106 can include a content management module 122 to facilitate the generation of an assembled content package. Specifically, the content management module 122 can combine content from one or more primary content providers $109_1$, $109_2$, . . . , $109_n$ (collectively "109") and content from one or more secondary content providers $110_1$, $110_2$, . . . $110_n$ (collectively "110") to generate the assembled content package for the user terminals 102. For example, in the case of a web page being delivered to a requesting one of user terminals 102, the content management module 122 can assemble a content package by requesting the data for the web page from one of the primary content providers 109 maintaining the web page. For the invitational content on the web page provided by the secondary content providers 110, the content management module 122 can request the appropriate data according to the arrangement between the primary and secondary content providers 109 and 110. Additionally, the content management module 122 can create content packages that contain content from a single content provider. That is, a content package can contain only primary content or a content package can contain only secondary content. However, the content package is not limited to the content from content providers 109 and 110. Rather, the content package can include other data generated at the content delivery system 106. In some embodiments, the content delivery system 106 can preselect the content package before a request is received.

An assembled content package can include text, graphics, audio, video, executable code, or any combination thereof. Further, an assembled content package can include invitational content designed to inform or elicit a pre-defined response from the user. In some embodiments, the invitational content can be associated with a product or can directly or indirectly advertise a product. For example, the assembled content package can include one or more types of advertisements from one or more advertisers.

Additionally, the invitational content can be active invitational content. That is, invitational content that is designed to primarily elicit a pre-defined response from a user. For example, active invitational content can include one or more types of advertisements configured to be clicked upon, solicit information, or be converted by the user into a further action, such as a purchase or a download of the advertised item. However, invitational content can also be passive invitational content. That is invitational content that is designed to primarily inform the user, such as a video. In some cases, passive invitational content can include information that can lead or direct users to other invitational content including active invitational content.

Furthermore, the invitational content can be dynamic invitational content. That is invitational content that varies over time or that varies based on user interaction. For example, dynamic invitational content can include an interactive game. However, the various embodiments are not limited in this regard and the invitational content can include static invitational content that neither varies over time nor with user interaction. In the various embodiments, invitational content in a content package can be static or dynamic and active or passive. A content package can include a combination of various types of invitational content in a single content package.

In some cases, a content package can replace or update invitational content in a content package already delivered to a user terminal. For example, a first content package can include an app that can be installed on the user terminal 102. A subsequent content package can include one or more items of invitational content that can be presented to a user of the user terminal $102_i$ while the user interacts with the app.

Although primary and secondary providers 109 and 110 are presented herein as separate entities, this is for illustrative purposes only. In some cases, the primary and the secondary content providers 109 and 110 can be the same entity. Thus, a single entity can provide both the primary and the secondary content.

The content management module 122 can be configured to request that content be sent directly from content providers 109 and 110. Alternatively, a cached arrangement can also be used to improve performance of the content delivery system 106 and improve overall user experience. That is, the content delivery system 106 can include a content database 150 for locally storing/caching content maintained by content providers 109 and 110. The data in the content database 150 can be refreshed or updated on a regular basis to ensure that the content in the database 150 is up to date at the time of a request from a user terminal 102. However, in some cases, the content management module 122 can be configured to retrieve content directly from content providers 109 and 110 if the metadata associated with the data in the content database 150 appears to be outdated or corrupted.

In some configurations, the content database 150 can maintain content items for presentation at the user terminals 102. The content database 150 can also maintain content associations with specific places, such as locales. Moreover, the content database 150 can maintain database corresponding to specific items of content. The metadata can specify unique identifiers, location information, association information, ranking information, etc. The content database 150 can also maintain lists of content items filtered or selected based on specific rules or criteria. For example, the content database 150 can maintain lists of content items that are relevant to specific geographic areas, demographics, segments, etc.

As described above, content maintained by the content providers 109 and 110 can be combined according to a predefined arrangement between the two content providers, which can be embodied as a set of rules. In an arrangement where the content delivery system 106 assembles the content package from multiple content providers, the assembly rules can be stored in a rules database 152 in the content delivery system 106. The content management module 122 can be configured to assemble the content package for user terminals 102 based on these rules. The rules can specify how to select content from secondary content providers 110 and primary content providers 109 in response to a request from one of user terminals 102. For example, in the case of a web page maintained by one of primary content providers 109 and including invitational content, the rules database 152 can specify rules for selecting one of the secondary providers 110. The rules can also specify how to select specific content from the selected one of secondary providers 110 to be combined with the content provided by one of primary providers 109. In some cases, an item of primary content, such as an app or other media object, can have one or more associated attributes. For example, an app can have one or more associated genre attributes, e.g. travel, sports, education, etc. A rule can be based at least in part on the primary content attributes. Once assembled, the assembled content package can be sent to a requesting one of user terminals 102.

Additionally, rules for combining primary and secondary content can be based on user characteristics known about the user. In particular, in some cases, invitational content can be selected based on the characteristics of the requesting user(s). As used herein, the term "user characteristics" refers to the characteristics of a particular user associated with one or more of user terminals 102. User characteristics can include channel characteristics, demographic characteristics, behavioral characteristics, and spatial-temporal characteristics. Channel characteristics can define the specific delivery channel being used to deliver a content package to a user. For example, channel characteristics can include a type of electronic content, a type of device or user terminal, a carrier or network provider, or any other characteristic that defines a specific delivery channel for the content package. Spatial-temporal characteristics can define a location, a location zone, a date, a time, or any other characteristic that defines a geographic location and/or a time for delivery of the content package. Demographic characteristics can define characteristics of the users targeted by the content or associated with the content. For example, demographic characteristics can include age, income, gender, occupation, or any other user characteristics. Behavioral characteristics can define user behaviors for one or more different types of content, separately or in combination with any other user characteristics. That is, different behavioral characteristics may be associated with different channel, demographic, or spatial-temporal characteristics. User characteristics can also include characteristics descriptive of a user's state of mind including characteristics indicative of how likely a user is to click on or convert an item of invitational content if it were displayed to the user. User characteristics can be learned directly or derived indirectly from a variety of sources. In some embodiments, the user characteristic values can be collected from one or more databases. For example, if the user is registered with an online media service, such as the ITUNES store maintained by Apple Inc. of Cupertino, Calif., the collected data could include the user's registration information. Such data can provide values for declared user characteristics. Furthermore, the content delivery system 106 can be configured to learn of or derive user characteristics from any number of other information sources. For example, in some configurations, the content delivery system 106 can derive or infer one or more user characteristic values from user characteristic values already known about the user.

In some embodiments, the interactive content can be associated with one or more targeted segments. A targeted segment can be viewed as defining a space or region in k-dimensional space, where each of the k dimensions is associated with one of a plurality of user characteristics. In the various embodiments, the k dimensions can include both orthogonal and non-orthogonal dimensions. That is, some of the k dimensions can overlap or can be related in some aspect.

In the various embodiments, the content delivery system 106 can also include a unique user identifier (UUID) database 154 that can be used for managing sessions with the various user terminal devices 102. The UUID database 154 can be used with a variety of session management techniques. For example, the content delivery system 106 can implement an HTTP cookie or any other conventional session management method (e.g., IP address tracking, URL query strings, hidden form fields, window name tracking, authentication methods, and local shared objects) for user terminals 102 connected to content delivery system 106 via a substantially persistent network session. However, other methods can be used as well. For example, in the case of handheld communications devices, e.g. mobile phones, smart phones, tablets, or other types of user terminals connecting using multiple or non-persistent network sessions, multiple requests for content from such devices may be assigned to a same entry in the UUID database 154. The content delivery system 106 can analyze the attributes of requesting devices to determine whether such requests can be attributed to the same device. Such attributes can include device or group-specific attributes.

In some embodiments, the content delivery system 106 can include a user-profile database 156. The user-profile database 156 can, at least in part, be constructed based on declared user characteristics related to one or more users. In some cases, the user-profile database may contain inferred or derived user characteristic values. The user-profile database 156 can be updated using a user-profile-updater module 124. In some embodiments, the user-profile-updater module 124 can be configured to add additional profile data, update profile data, fill in missing profile data, or infer user characteristic values from declared data.

The user-profile-updater module 124 can also be configured to maintain the user profile database 156 to include only more recently acquired data or to re-derive any inferred characteristics in order to ensure that the user profile is an accurate reflection of the current state of the user (location, state of mind, behaviors, demographics, etc. can change rapidly). For example, the user-profile-updater module 124 can be configured to maintain the user profile database 156 to include only data from the last two to three months. However, the user-profile-updater module 124 can be configured to adjust the data in the user profile database 156 to cover any span of time. In some instances the user-profile-updater module 124 can update the profile database 156 in real-time. Alternatively, the user-profile-updater module 124 can be configured to set an expiration period on a subset of the data in the user profile database 156. For example, a policy can specify that user declared data is maintained as long as the user account is active, but user characteristic values based on location information expire after a specified period of time. In some cases, a user can set the expiration period. In some instances, the user-profile-updater module 124 can update the user profile database 156 at least every week, or every day. In some cases, the content delivery system 106 can receive a direct request to update one or more user profiles. The update request can come directly from the user's device or any other device capable of communicating with the content delivery system 106, such as other content delivery networks or websites. In some cases, the content delivery system 106 can receive an indirect request to update one or more user profiles. An indirect request can be the result of receiving new user characteristic values. An update request can occur at any time.

In some embodiments, the content delivery system 106 can include a segment database 158 that is used to aid in selecting invitational content to target to users. The segment database 158 can store defined segments and associations between the segments and users and/or invitational content that should be targeted to users associated with the segments. As described above, a targeted segment can be defined based on one or more user characteristics or derivatives thereof and can be associated with one or more items of invitational content. Additionally, a targeted segment can be associated with one or more users. In some embodiments, by associating a targeted segment with both a user and an item of invitational content, the delivery system can match invitational content with users. In some embodiments, the content delivery system 106 can update the segment database 158 to add newly defined targeted segments or to delete targeted segments.

In some cases a targeted segment can be as simple as a single user characteristic identifier and a single user characteristic value. For example, the common demographic identifiers of gender, age, occupation, or income can each be used in defining corresponding targeted segments. A characteristic value can also be assigned to the identifier. For example, the values of male, 19, and student can be assigned to the user characteristics of gender, age, and occupation, respectively. However, more complex targeted segments can also be defined that consist of one or more identifiers with one or more values associated with each identifier. For example, a targeted segment can be defined to target a user with the following characteristics: gender, male; age, 19-24; location, Northern California or New York City. Additional exemplary segments are described throughout this disclosure. Furthermore, targeted segments can correspond to one or more segments that content providers are likely to easily understand and thus can quickly identify as being relevant to their content. Additionally, in some embodiments, content providers 109 and 110 can define a custom targeted segment.

In some embodiments, the content delivery system 106 can provide a segment assigner module 126. The segment assigner module 126 can apply a set of user characteristics associated with a user (including segments to which a user has been previously assigned) to assign the user to one or more targeted segments. The assigner module 126 can obtain the set of user characteristic values from the user profile database 154 and/or from the user's activities during the current session. The segment assigner module 126 can assign a user to one or more defined targeted segments in the segment database 158, or alternatively, a user can be assigned to a custom targeted segment defined to meet specific goals of a content provider.

Based on the assigned segments, the user profile database 156 can be updated to reflect the segment assignments. Additionally, the content delivery system 106 can use the segment assignments to select targeted content. In some cases, the user profile data in the user profile database 156 can change over time so the segment assigner module 126 can be configured to periodically update the segment assignments in the user profile database 156. The segment assignment update can be triggered at specified intervals, upon detection of a change in the user profile database 156, and/or upon detection of a specified activity in the content delivery system 106.

In some embodiments, the content delivery system 106 can provide a prioritizer module 128. The prioritizer module 128 can perform a variety of prioritizing tasks based on the configuration of the content delivery system 106. In some configurations, the prioritizer module 128 can prioritize the targeted segments assigned to a user. The prioritization can be influenced by a number of factors, which can include the user's context, a content provider's campaign goals, and/or the content that is currently available for display to the user. A request to prioritize the targeted segments can be explicit or implicit and can be made by any component of the system 100. For example, a secondary content provider 110 can explicitly request that the content delivery system 106 prioritize the targeted segments or the request can be implicit as part of a request for a content package. The resulting prioritized list can be provided, for example, to the content management module 122, which can then use the information to assemble and deliver a content package. Additionally, the prioritized list can be stored, for example in the user profile, for later use.

In some embodiments, the content delivery system 106 can include a content-listing module 130. The content-listing module 130 can generate and/or maintain lists of content items, such as invitational content, that are estimated to be of interest to a user. The content-listing module 130 can also generate and/or maintain lists of places of interest for a user. The items in any particular list generated or maintained by the content-listing module 130 can be selected based on location data associated with the user terminals 102. For example, the content-listing module 130 can generate a specific list of items based on location data from one or more user terminals 102. The content-listing module 130 can also identify a geofence for the user terminals 102 based on the location data. The geofence can specify a geographic area or a perimeter, and the content-listing module 130 can identify and select items associated with the geographic area, for inclusion in a list of items. Thus, the list of items can include items specific to the geographic area. For example, the list of items can include advertisements for businesses located within the geographic area.

The content-listing module 130 can identify and/or select specific items to include in a list of items from one or more master lists of items or databases. For example, the content-listing module 130 can access a database containing all content items and search or filter the content items based on the determined geofence to identify and/or select those content items associated with a specific geographic area or perimeter specified in the geofence. The content items in the master list or database can include associations with specific businesses, people, locales, entities, or locations to enable the content-listing module 130 to identify content items having specific associations. In some configurations, the content items can include metadata defining their respective associations to enable the content-listing module 130 to search and identify content items having specific associations, as previously described. Here, the metadata of the content items can also include additional information which can be used by the content-listing module 130 to search, filter, identify, order, or rank the content items. For example, the metadata can include a respective, unique identifier associated with the content item; the content item's association (e.g., the relationship or association defined for that particular content item); the identity of the content item's associated place or entity; etc. As another example, the metadata can include a tag, a description of the content item or its associated place, a location of the content in storage, a location of the place(s) associated with the content item, a rank of the content item and/or the place associated with the content item, a label, a URL, a preference, an identity, a status, a category, usage information, a configuration, a capability, a playback configuration, etc.

The content-listing module 130 can rank or order items in any specific list of items. For example, the content-listing module 130 can rank items based on their specific location relative to another location, such as a current location of a user terminal $102_i$, a predicted location of the user terminal $102_i$, a location of a locale, a location of a third party, a location of other devices, an identity of the user and/or the user terminal $102_i$, an identity of a place or locale, a history, a popularity, etc.

While the content delivery system 106 is presented with specific components, it should be understood by one skilled in the art, that the architectural configuration of system 106 is simply one possible configuration and that other configurations with more or less components are also possible.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

Figure 2:
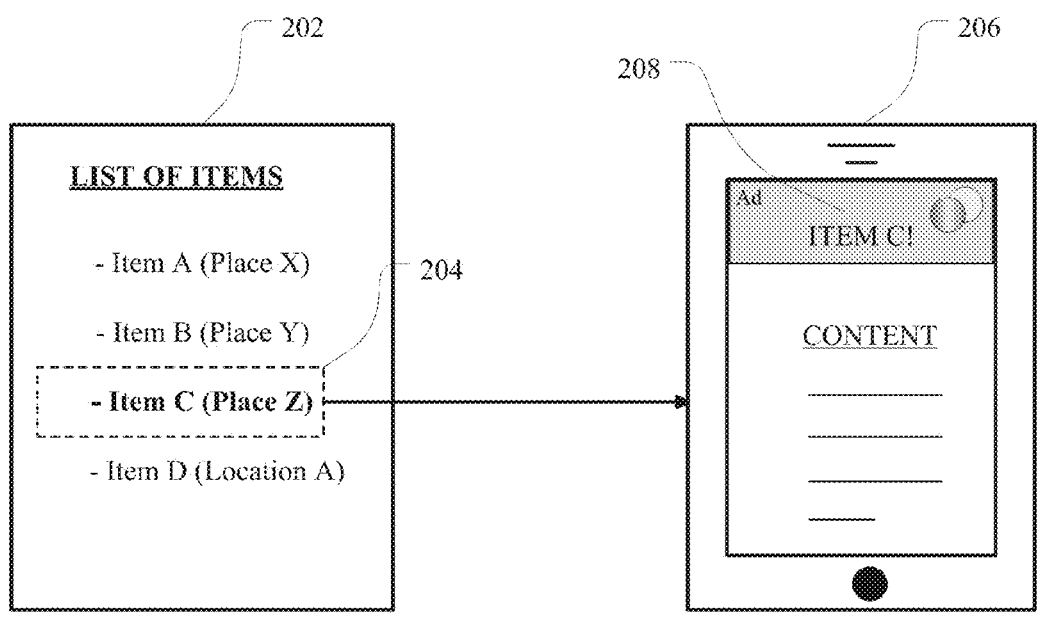
FIG. 2 illustrates an exemplary system for selecting places of interest.

The disclosure now turns to FIG. 2, which illustrates an exemplary system for selecting items for presentation to a user. Here, the client device 206 can analyze a list of items 202 and select a particular item 204 for presentation at the client device 206. The list of items 202 can include media items, such as invitational content, associated with places within a geographic area. The geographic area can be based on a location of the client device 206. Moreover, the items in the list of items 202 can include, for each content item, a content identifier, a label, a ranking, a name, a location, an association, an identity of a place associated with the respective content item, a preference, presentation parameters, etc.

Further, the client device 206 can select the particular item 204 based on the location of the client device 206. For example, the client device 206 can select the particular item 204 based on a proximity of the client device 206 to each of the places associated with the items on the list of items 202. This way, the client device 206 can ensure that the item selected is relevant to the user's location. The client device 206 can also select the particular item 204 based on one or more other factors, such as a user preference, a popularity, a ranking, a time, a context, a status, a content type, a type of place associated with an item, etc.

Once the client device 206 has selected the particular item 204 from the list, it can display or provide a presentation 208 of the particular item 204. For example, if the particular item 204 is an advertising banner, then the client device 206 can present the advertising banner after selecting it from the list of items 202. The presentation 208 can refer to a visual presentation such as an image display, an audio presentation such as an audio advertisement, a video presentation such as a video clip; etc. The client device 206 can store the particular item 204, and any of the other items on the list of items 202, on a local storage or cache, to allow the client device 206 to quickly access the selected item without having to receive it over the network. However, in some configurations, the client device 206 can receive the list of items 202 and each content item from the list of items 202 from a server, and select and present one or more of the content items from the list of items 202.

Moreover, the client device 206 can locally store and execute the logic for selecting the particular item 204 from the list of items 202. In some configurations, the client device 206 can receive the list of items 202 from a server, select an item from the list, and locally retrieve and present the selected item. The client device 206 can receive the list of items 202 from the server in response to a request for the list from the client device 206. The request can include location data, a geographic area, a boundary, or any other geofencing data, which the server can use to determine which list of items to send to the client device 206.

The list of items 202 can include an ordering of content items which satisfy a geofencing criteria associated with the client device 206, and which the client device 206 can use to select or determine which content item to present to a user. In some embodiments, each of the content items can include a name, label, or identifier of the respective content item. Moreover, each of the content items can define a place, location, or business that the respective content item is associated with. For example, if Item A is an advertisement for Place X, then Item A can include the name of Place X (or any identifier), to indicate that it is associated with Place X. Thus, if client device 206 selects Place X from the other places in the list, then the client device 206 can present Item A, which client device 206 knows is associated with Place X based on the information in the list of items 202, to a user at the client device 206. In some cases, each of the content items in the list can also include additional information, such as location information, scoring information, ranking information, preference information, popularity, etc. For example, each of the content items can include location information defining a specific location of a respective place associated with the specific content item. The client device 206 can then use the location information to select a particular content item. The client device 206 can compare the location of the client device 206 with the location information of each of the content items to select a particular content item. The client device 206 can also compare the location information of the content items with each other. The client device 206 can use the comparison results to select a content item that is associated with the closest place relative to the client device 206, vis-à-vis the other places associated with the remaining content items in the list. This way, the client device 206 can select and present the content item for the closest place in the area. The client device 206 can thus avoid presenting content items for places that are farther from the client device 206 or otherwise inconvenient for the user associated with the client device 206.

Figure 6B:
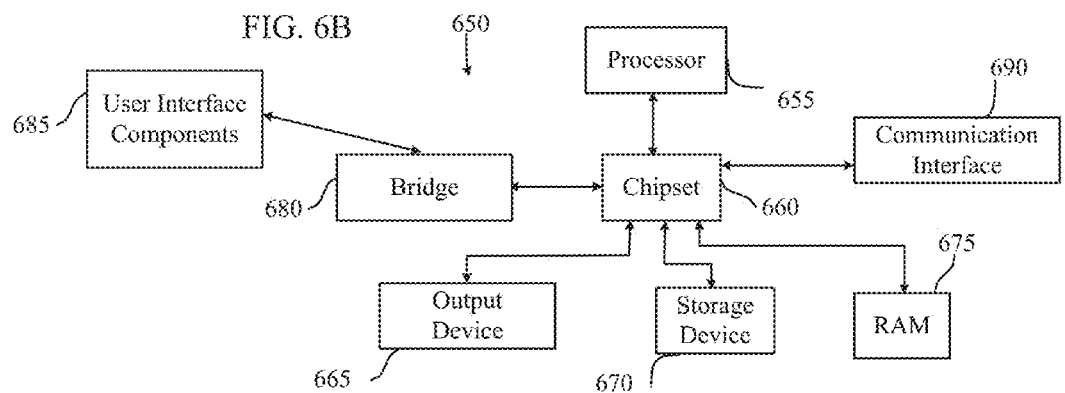
FIGS. 6A and FIG. 6B illustrate exemplary system embodiments.
Figure 6A:
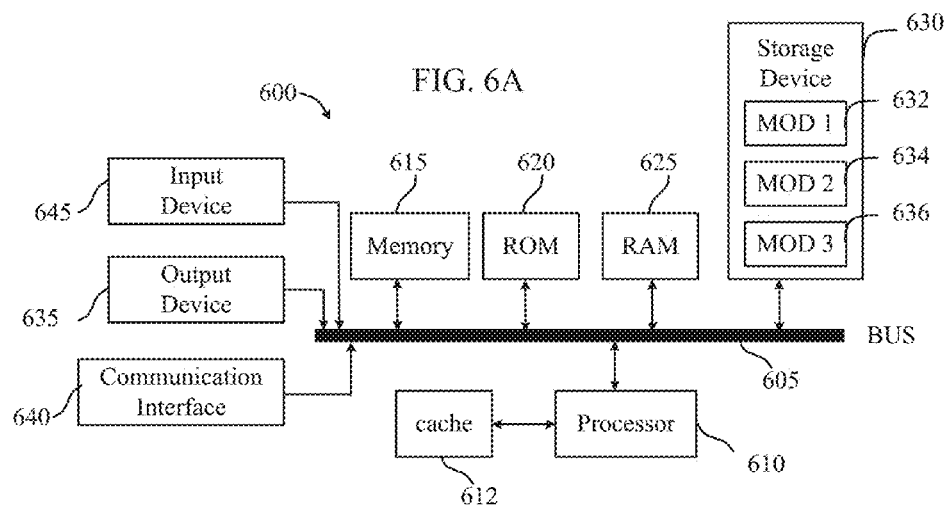

The client device 206 can be a user terminal $102_i$, as illustrated in FIG. 1, or any other computing device, as illustrated in FIGS. 6A and 6B. Moreover, the client device 206 can receive the list of items 202 from a server, such as content delivery system 106 illustrated in FIG. 1. Further, while FIG. 2 illustrates one item from the list of items 202 being selected by the client device 206, one of ordinary skill in the art will readily recognize that, in some embodiments, the client device 206 can select more than one item from the list of items 202. For example, the client device 206 can select multiple items from the list of items 202 to form a sequence of content items or any other presentation of content items.

Figure 3:
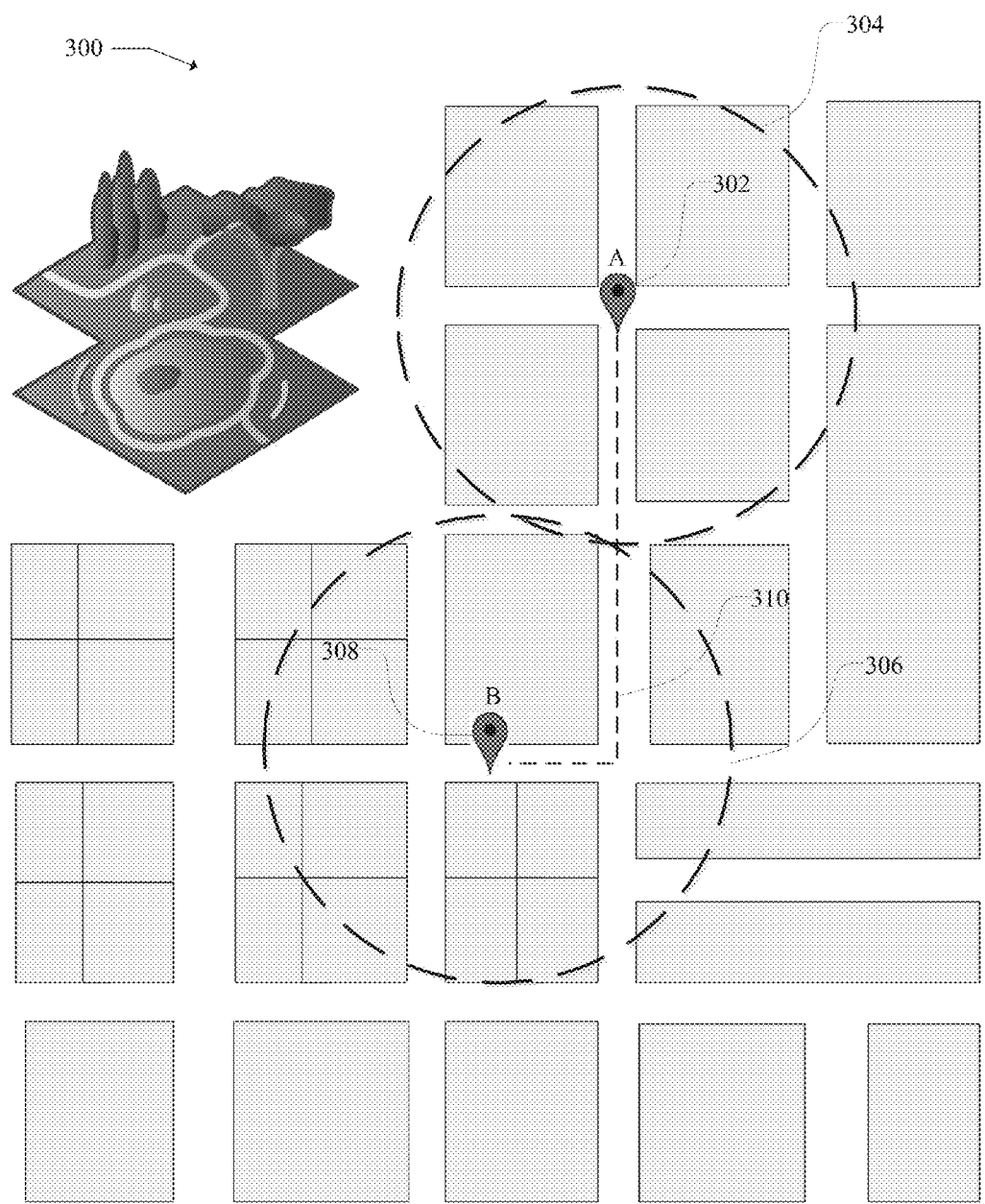
FIG. 3 illustrates an exemplary location map for geofencing content.

FIG. 3 illustrates an exemplary location map 300 for geofencing content. The location map 300 can illustrate the current position 302 of a client device. The current position 302 can be determined by the client device based on sensed data, such as GPS data, cellular triangulation data, and/or any other location data, including user input data defining location parameters. The current position 302 can refer to a location of the client device, such as an address, one or more coordinates, a landmark, a locale, a degraded position, etc.

Based on the current position 302, the client device or a server can determine a current geofencing area 304, which can define an area of a specific size based on a threshold, maximum distance from the client device. For example, the current geofencing area 304 can define a perimeter calculated for the client device based on the current position 302 and a predefined threshold distance, such as 30 meters or 100 yards. As another example, the current geofencing area 304 can encompass all areas within a predefined distance from the current position 302, such as all areas within 1 mile of the current position 302. In some embodiments, the current geofencing area 304 can be defined based on a radius corresponding to a predefined distance from the current position 302. In other embodiments, the current geofencing area 304 can be an arbitrarily-shaped geographic area or an asymmetrically-shaped geometric area. For example, the geogencing area 304 can represent an elongated park or area to target park goers, or a tight band or strip of land along a railway track to target train passengers, and so forth. Here, the geofencing area 304 can be based not only on a center point location but also additional points, portions, or borders in one or more areas or distances, and can even include, as previously mentioned arbitrary points or locations.

As previously mentioned, when determining the current geofencing area 304, the client device or server can use the current position 302 and a predefined distance. The predefined distance can be configured by a user, a server, an advertiser, etc. Moreover, the predefined distance can be modified and can change from previously-used distance parameters, for example. Further, the predefined distance can be configured based on one or more factors, such as the current location, the density of the area, the type of area, the surrounding environment, the date, the season, the context of a user, a travel history, a predicted location of the client device at a future time, a current speed, a profile, etc. In some cases, the distance can be a dynamic distance, as opposed to a predefined distance. The dynamic distance can be calculated by the client device or a server based on any of the factors previously described, for example. In addition, the dynamic distance can be calculated in real time (or near real time), and can be updated based on sensed data, preferences, or any additional data collected by the client device or server calculating the dynamic distance. Once the dynamic distance is calculated, it can be used to determine the geofencing area 304, as previously described. To this end, the geofencing area 304 can also be dynamic in the sense that it can be updated, refreshed, or modified as new conditions, rules, or parameters are obtained.

The current position 302 and the geofencing area 304 can be used by the client device to select one or more content items to present to a user at the client device. For example, the client device can review advertisements for locales within the geofencing area 304 to select one or more advertisements for presentation at the client device based on the advertisements corresponding to the locales within the geofencing area 304. The client device can select one or more of the advertisements within the geofencing area 304 based on the current position 302. For example, the client device can identify the closest locale to the current position 302 within the geofencing area 304, and select the content item associated with the closest locale. As another example, the client device can identify the locale calculated to correspond to the fastest travel time from the current position 302, and select a respective content item for that locale. The fastest locale can be calculated to account for traffic conditions, road conditions, relative distance, transportation mode, and any other factor. Moreover, by using the current position 302 and the geofencing area 304 to select content items for presentation to a user at the client device, the client device can ensure that the select content item(s) is relevant and convenient to the user's current context, for example. This way, the client device can also increase the likelihood of presenting to the user a content item that is of interest to the user.

The location map 300 can also illustrate a predicted position 308 at a future time. The predicted position 308 can be predicted by the client device, for example, based on user inputs, application data, statistics, and sensed data. For example, in some cases, if the client device is used for navigation, the predicted position 308 can be obtained at least in part from the navigation application. The sensed data can refer to any data collected, measured, captured, or detected by a sensor. For example, the sensed data can include data obtained from an accelerometer, a gyroscope, a GPS, a camera, a microphone, a touch screen, a light sensor, a scanner, a magnetometer, a pedometer, a timer, etc. The sensed data can be collected from one or more sensors at the client device and/or a separate device. In some embodiments, the sensed data can include information regarding the motion or movement of the client device, the motion or movement of surrounding objects, the position or location of the client device, one or more coordinates associated with the client device, a velocity of the client device, an acceleration of the client device, a direction of the client device, etc. The sensed data can be collected or measured at one or more specific points in time, specific intervals, scheduled periods, etc.

Moreover, this information can then be used by the client device to predict a position at a future time based on the current position 302. For example, the client device can determine the current position 302 and detect a current movement, direction, and speed from the current position 302 to determine the predicted position 308. Thus, if the client device detects southbound movement (e.g., 180 degrees) at 20 feet per minute, the client device can predict a position of the client device in 15 minutes by adding 20 feet per minute X 15 minutes in the southbound direction from the current position 302. This example can assume that the direction and velocity will be constant throughout the 15 minutes of travel. However, in some embodiments, the client device can periodically collect sensed data, such as velocity and direction, to periodically update the predicted position 306 as any changes are detected based on a change of parameters (i.e., velocity and/or direction).

Based on the current position 302, the predicted position 308, and any of the sensed data, the client device or a server can also predict a path 310 of the client device from the current position 302 to the predicted position 308. The path 310 can be used to update geofencing parameters and selecting content items and places of interest for a user. The path 310 and/or the geofencing area 306 can also be used by a server to suggest or provide a list of places of interest to the client device.

Moreover, the predicted position 308 and the path 310 can also be used to determine a predicted geofencing area 306. The geofencing area 306 can be calculated based on a distance from the predicted position 308, such as a predefined or dynamic distance, as previously explained. The predicted position 308 and the predicted geofencing area 306 can then be used to select content items and locales for presentation to a user at a future time. For example, the predicted position 308 is used to select a content item from a list of content items associated with the predicted geofencing area 306. Here, the content item can be selected based on a proximity of an associated locale relative to the predicted position 308 and/or the other associated locales corresponding to the remaining content items in the list.

Further, as previously mentioned, the content item can be selected for presentation at a future time. The future time can be the same time used to calculate the predicted position 308. For example, if the predicted position 308 is calculated for 3 PM, the predicted position 308 can be used to select content items and locales for presentation to the user at 3 PM. However, in some cases, the content items and locales can be presented to the user at a different time than the time used to calculate the predicted position 308. For example, if the predicted position 308 is calculated for 10 minutes after the current time, the client device can select to present the content item 5 minutes after the current time, to ensure that the content item is presented to the user before the user reaches the predicted position 308. Indeed, the content item selected based on the predicted position 308 can be presented to the user at a current time, based on an expectation that the user will be at the predicted position 308 in the future.

In some embodiments, the client device can also use the path 310 to select content for presentation to the user. For example, the client device can obtain a list of locales along the path 310, and select presentation content associated with one or more locales along the path 310.

In some cases, the location map 300 can display specific locales within the geofencing areas 304, 306 and/or the path 310. The location map 300 can also display additional objects, such as landmarks, roads, buildings, labels, tags, text, etc. In some embodiments, the location map 300 can be presented to the user at the client device to illustrate nearby locales and content items, for example. Moreover, the location map 300 can be used by the client device or a server to identify locales and content items, and filter lists of items and select specific locales or content items.

As one of ordinary skill in the art will readily recognize, the content items described herein can refer to invitational content, advertisements, banners, application content, media content, dynamic content, static content, animated content, etc. Moreover, one of ordinary skill in the art will readily recognize, the locales described herein can refer to businesses, landmarks, organizations, locations, points on a map, places in an geographic area, structures, virtual objects, etc.

FIG. 4 illustrates an exemplary location prediction table 400. The location prediction table 400 can be used to maintain values 402 for use in predicting a location of a client device at one or more future times. For example, the location prediction table 400 can store a current location of the client device, a velocity, a direction, an acceleration, a context, etc. The location prediction table 400 can be configured to store one or more integers, strings, objects, matrices, etc. For example, the current location can be stored in the location prediction table 400 as one or more coordinates, an address, and so forth. In some embodiments, the context field can be used to store multiple values of a context of a user. For example, the context field can be a matrix with various values for the user context. The context can include, for example, a transportation mode of the user, a road type, an activity level of the user, a mode of use of the client device by the user, a time, a traffic, application usage information, a status, an environment, an operating status, an event, current conditions, etc.

The values 402 can be used to calculate predicted locations 404 and 406. For example, the current location, the direction, the velocity, and the acceleration values can be used to calculate the predicted locations 404 and 406. Moreover, the predicted locations 404 and 406 can be calculated for predefined times in the future. For example, the predicted location 404 can be calculated for 10 minutes after the current time and the predicted location 406 can be calculated for 20 minutes after the current time. The location prediction table 400 can more or less predicted values than those illustrated in FIG. 4. Predicted locations 404 and 406 are provided for illustration purposes. Moreover, the values 402 illustrated in FIG. 4 are for illustration purposes. Other values are contemplated herein.

Figure 5:
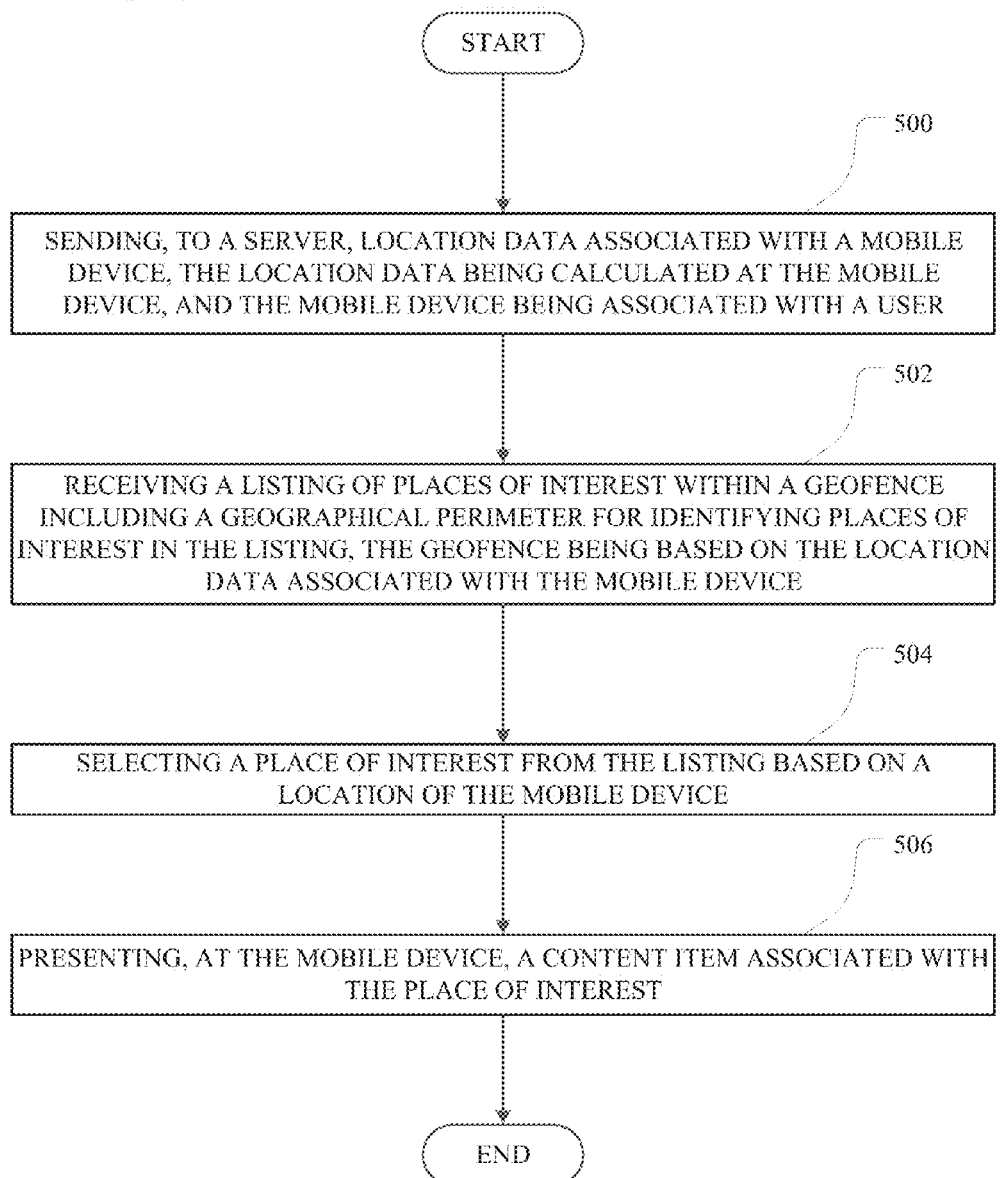
FIG. 5 illustrates an exemplary method embodiment.

Having disclosed some basic system components and concepts, the disclosure now turns to the exemplary method embodiment shown in FIG. 5. For the sake of clarity, the method is described in terms of a user terminal $102_i$, as shown in FIG. 1, configured to practice the method. The steps outlined herein are exemplary and can be implemented in any combination thereof, including combinations that exclude, add, or modify certain steps.

The user terminal $102_i$ first sends, to a server, location data associated with the terminal $102_i$, the location data being calculated at the terminal $102_i$ (500). The location data can include a degraded location. Thus, the location data sent to the server can be degraded prior to being sent to the server. The degraded location can include one or more coordinates, an address, a landmark, a range of location parameters, and so forth. Moreover, the location data can be determined by the system using a GPS or cellular technologies, such as triangulation and cell identification.

The location data can be calculated at the terminal $102_i$ using sensors, user inputs, stored data, and/or external data.

For example, the location data can include sensor data collected by terminal $102_i$. The sensor data can refer to any data collected, measured, captured, or detected by a sensor associated with the terminal $102_i$. For example, the sensor data can include data obtained from an accelerometer, a gyroscope, a global positioning system (GPS), a camera, a microphone, a touch screen, a light sensor, a scanner, a magnetometer, a pedometer, a timer, etc. In some embodiments, the sensor data can include information regarding the motion or movement of the terminal $102_i$, the motion or movement of surrounding objects, the position or location of the terminal $102_i$, one or more coordinates associated with the terminal $102_i$, a velocity of the terminal $102_i$, an acceleration of the terminal $102_i$, a direction of the terminal $102_i$, etc.

Moreover, the terminal $102_i$ can also send, to the server, a request for a listing of places of interest based on the location data or a geofence identified based on the location data. The request can be triggered by a user action, such as a user input, a user activity, a user status, an application usage, a device usage, and so forth. The request can also be triggered based on additional status information, such as a device status, for example. Thus, in some cases, the content items or advertisements presented by the terminal $102_i$ based on geofence information here can be triggered by a user action. For example, the user's request to launch an application on the terminal $102_i$ can trigger a geofence-based presentation of content as previously described.

Next, the terminal $102_i$ receives a listing of places of interest within a geofence including a geographical perimeter for identifying places of interest in the listing, the geofence being based on the location data associated with the terminal $102_i$ (502). The listing of places can be received from a server that maintains a database or master list of places. However, in some cases, the terminal $102_i$ can also maintain the list of places and may not need to receive the list from a server or a separate device. Moreover, the listing of places of interest can be a list of places filtered from the database or master list of places at the server. The places can be filtered to create the listing of places of interest based on the geofence information and location data associated with each of the places in the database or master list. Further, the listing of places of interest can be ordered or ranked based on one or more factors, such as a category, a rating, a cost, a preference, and so forth.

In some cases, the listing of places of interest can include a respective content item associated with each place in the listing of places of interest. For example, the listing of places of interest can include one or more media items for each place of interest in the list. The content items can include invitational content associated with a campaign of invitational content, for example.

The terminal $102_i$ then selects a place of interest from the listing based on a location of the terminal $102_i$ (504) and presents a content item associated with the place of interest selected (506). Here, the terminal $102_i$ can calculate its current or predicted location and select a specific place of interest from the listing based on the calculated values. The terminal $102_i$ can use the location data to calculate its current or predicted location. A predicted location of the terminal $102_i$ can also be determined based on a user input, such as a gesture; a velocity; an acceleration; a direction; a movement; etc.

When selecting a place of interest, in some cases, the terminal $102_i$ can weigh a proximity of each of the places in the listing relative to the terminal $102_i$ and generate respective rankings of each of the places to select the place of interest. The terminal $102_i$ can also filter the listing based on one or more ranking levels of the places in the listing, and further filter the listing based on a proximity to identify or select the specific place of interest best matching the applied criteria. The terminal $102_i$ can also filter the listing to select the place of interest based on one or more additional factors, such as an age or date of associated content; a proximity relative to a second place, such as a bank; a category of content or items; a preference; a keyword; etc. For example, the user terminal $102_i$ can select two or more places of interest according to specific criteria, as previously mentioned. The user terminal $102_i$ can then present multiple items of content based on the multiple places of interest selected by the user terminal $102_i$.

After selecting the specific place of interest, the terminal $102_i$ can present an item of invitational content corresponding to the place of interest selected. This way, the terminal $102_i$ can target content to the user based on the user's location, and any other additional criteria. The targeting of such content can be provided at the client-side, as opposed to server-side, to limit or minimize the amount of private information transmitted to the server for targeting content. For example, the terminal $102_i$ can be a client device configured to present media items to a user based on a user's location as determined by terminal $102_i$, without having to transmit specific details regarding the user's location to a server, or otherwise share the user's private information.

In some cases, the user terminal $102_i$ can use location data to calculate its current or predicted location. A predicted location of the user terminal $102_i$ can also be determined based on a user input, such as a gesture; a location or movement history; a velocity; an acceleration; a context, such as a transportation mode, a computing state, or a current activity; surrounding conditions, such as traffic, weather, or time of day, a relevant environment, such as a landscape; etc. Moreover, the predicted location can be determined for one or more specific points of time or intervals. For example, a predicted location can be determined for 15 and 30 minutes after the current time. The predicted location can also refer to a predicted path or course of a user associated with the user terminal $102_i$. For example, the predicted location can correspond to a vector imposed on a map indicating the predicted path or course of a user based on a current location and one or more additional factors, such as speed, direction, context, acceleration, etc.

The places of interest can refer to items of content, such as invitational content, associated with locales, businesses, landmarks, brands, organizations, locations, or any geographical places. For example, in some embodiments, the places of interest can refer to media content items associated with specific locales. Here, the geographical perimeter can be for identifying media content items within a particular distance of the user terminal $102_i$. Further, the places of interest can also refer to content items associated with specific places from a list or database of places in an area.

FIG. 6A, and FIG. 6B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that exemplary systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language reciting "at least one of" a set indicates that one member of the set or multiple members of the set satisfy the claim. Tangible computer-readable storage media, computer-readable storage devices, or computer-readable memory devices, expressly exclude media such as transitory waves, energy, carrier signals, electromagnetic waves, and signals per se.

We claim:

1. A method comprising:
    based on one or more location parameters received from one or more sensors on a mobile device, determining, by the mobile device, a location of the mobile device;
    sending, from the mobile device to one or more servers, an indication of the location of the mobile device;
    receiving, by the mobile device from the one or more servers, a geofence calculated based on the indication of the location of the mobile device, a list of entities determined to reside within the geofence, and respective media items associated with the entities in the list;
    in response to receiving the geofence, the list, and the respective media items, determining, by the mobile device, an updated location of the mobile device based on one or more updated location parameters received from the one or more sensors;
    selecting, by the mobile device, a particular entity from the list and a respective media item from the respective media items based on the updated location determined by the mobile device; and
    presenting, at the mobile device, the respective media item associated with the particular entity.

2. The method of claim 1, wherein the particular entity is presented at the mobile device when the mobile device is within a threshold distance of the particular entity.

3. The method of claim 1, wherein the entities in the list of entities comprise locales, wherein each of the respective media items corresponds to a respective locale and comprises targeted content that is specific to the respective locale.

4. The method of claim 1, wherein the location comprises a first geographic location and the updated location comprises a second geographic location, wherein the first geographic location and the second geographic location comprise at least one of a current geographic location or a predicted geographic location.

5. The method of claim 4, wherein the particular entity is selected from the list based on at least one of a user trajectory, a user context, or a current activity associated with the mobile device.

6. The method of claim 5, wherein the user trajectory comprises a direction and velocity determined based on sensor data, the sensor data comprising at least one of accelerometer data, gyroscope data, and global positioning system (GPS) data.

7. The method of claim 4, further comprising determining the predicted geographic location of the mobile device based on a calculated direction and a calculated velocity associated with the mobile device.

8. The method of claim 1, wherein the location is different than the updated location, and wherein the geofence comprises a geographic perimeter around the mobile device calculated based on the indication of the location of the mobile device.

9. A mobile device comprising:
    one or more processors; and
    one or more computer-readable storage devices having stored therein instructions which, when executed by the one or more processors, cause the mobile device to:
        based on one or more location parameters received from one or more sensors on a mobile device, determine a first geographic location of the mobile device;
        send, to one or more servers, an indication of the geographic location of the mobile device;
        receive, from the the one or more servers, a listing of entities within a geographical perimeter determined based on the indication of the geographic location and respective media items associated with the entities in the listing;
        in response to receiving the geographical perimeter, the listing, and the respective media items, determine a second geographic location of the mobile device based on one or more updated location parameters received from the one or more sensors;
        select a particular entity from the listing and a respective media item from the respective media items based on the second geographic location of the mobile device; and
        present the respective media item associated with the particular entity.

10. The mobile device of claim 9, wherein the particular entity is presented at the mobile device when the mobile device is within a threshold distance of the particular entity.

11. The mobile device of claim 9, wherein the entities in the listing of entities comprise locales, wherein each of the respective media items corresponds to a respective locale and each of the respective media items comprises targeted content that is specific to the respective locale.

12. The mobile device of claim 11, wherein the first geographic location comprises a predicted location and the second geographic location comprises a current location or a predicted location.

13. The mobile device of claim 9, wherein the particular entity is selected from the listing based on at least one of a state associated with the mobile device, a user context, or a current user activity.

14. The mobile device of claim 9, wherein the particular entity is selected from the listing based on a user trajectory and current activity at the mobile device.

15. A server comprising:
one or more processors; and
one or more computer-readable storage devices having stored therein instructions which, when executed by the one or more processors, cause the server to:
receive, from a mobile device via a network, location parameters identifying a geographic location of the mobile device;
determine a geofence based on the location parameters, the geofence comprising a geographical perimeter around the geographic location;
identify a first list of entities within the geofence, wherein the entities in the first list are identified from a second list of entities maintained by the server, wherein the second list is populated with a plurality of entities based on respective media items maintained by the server;
for each entity in the first list of entities, identify a respective media item associated with the entity in the first list of entities; and
send, to the mobile device, the first list of entities and the respective media item identified for each entity in the first list of entities.

16. The server of claim 15, wherein the geographic location comprises at least one of a current location of the mobile device or a predicted location of the mobile device.

17. The server of claim 15, wherein the one or more computer-readable storage devices stores additional instructions which, when executed by the one or more processors, cause the server to:
rank entities in the first list to yield a ranked list; and
send the ranked list to the mobile device along with the first list of entities and the respective media item.

18. The server of claim 15, wherein the one or more computer-readable storage devices stores additional instructions which, when executed by the one or more processors, cause the server to:
select, from the respective media items maintained by the server, the respective media item for each entity in the first list; and
send the the respective media item to the mobile device along with the first list.

19. The server of claim 15, wherein the location parameters comprise a range of geographic locations.

20. The server of claim 15, wherein the location parameters identify a predicted future geographic location, wherein the geofence is based on the predicted future geographic location.

* * * * *